United States Patent Office 3,709,800
Patented Jan. 9, 1973

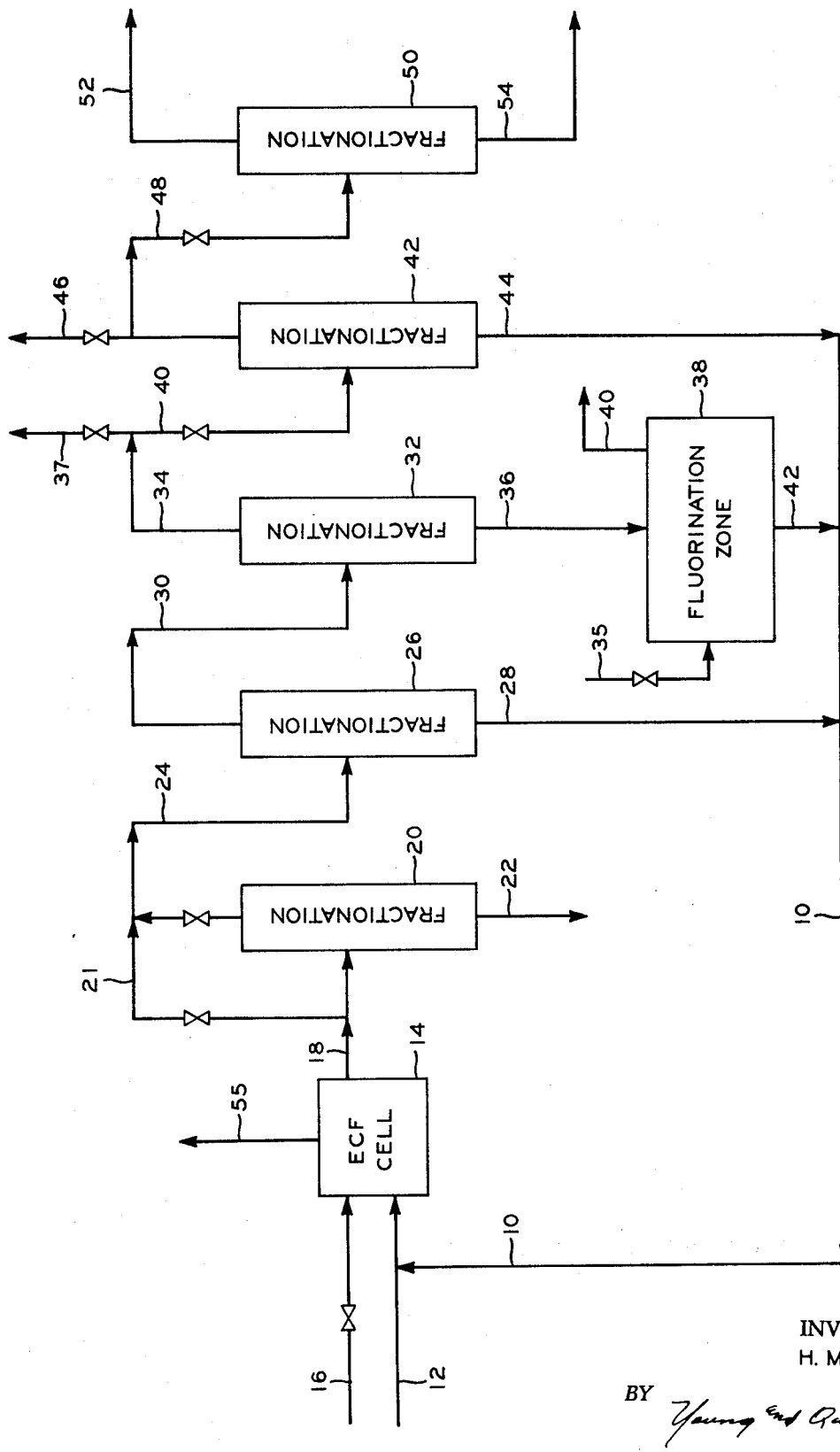

3,709,800
PROCESS FOR PREPARING PERFLUOROCARBON COMPOUNDS
Homer M. Fox, Bartlesville, Okla., assignor to Phillips Petroleum Company
Filed Mar. 19, 1971, Ser. No. 126,115
Int. Cl. C07b 29/06; C07c 19/08, 17/20
U.S. Cl. 204—59 R                12 Claims

ABSTRACT OF THE DISCLOSURE

Perfluorocarbon compounds are produced by a process comprising a combination of steps including electrochemical fluorination and chemical fluorination.

---

This invention relates to the preparation of perfluorocarbon compounds.

Herein and in the claims, unless otherwise specified, the term "perfluorocarbon(s)" refers to compounds which contain only fluorine and carbon; and the term "partially fluorinated halohydrocarbon(s)" refers to compounds containing only fluorine, carbon, hydrogen, and another halogen other than fluorine, e.g., chlorine. For convenience, the invention will be described herein with particular reference to partially fluorinated halohydrocarbons wherein chlorine is the halogen present other than fluorine, for example, partially fluorinated chlorohydrocarbon(s). However, the invention is not so limited. Said other halogen can also be bromine or iodine.

Perfluorocarbon compounds such as perfluoroethane, perfluoropropane, perfluorobutane, etc., are materials having useful and valuable utility. For example, in many processes such materials are essentially inert and are useful as inert solvents, diluents, etc. Said perfluorocarbons, and particularly perfluoropropane, are quite useful as dielectrics.

Chemical processes for making perfluorocarbon compounds are known in the art. One such process comprises starting with a chlorohydrocarbon and chemically substituting fluorine for chlorine using hydrogen fluoride, elemental fluorine, or chlorine trifluoride as fluorinating agents, with or without suitable catalysts. These processes are tedious, time consuming, and, in general, can be carried to completion only with difficulty. The more powerful fluorinating agents, such as elemental fluorine and chlorine trifluoride, are highly reactive and reactions involving the same are characterized by rapid evolution of large quantities of heat, sometimes with explosive violence, and by the scission of carbon-carbon bonds.

Another known process for preparing perfluorocarbon compounds comprises the electrochemical fluorination of hydrocarbons. In general, such processes are preferred to the above-described conventional chemical fluorination processes. However, one difficulty with said electrochemical fluorination processes is that there is frequently obtained in the cell effluent a mixture of products having different amounts of fluorination ranging from some unconverted hydrocarbon feedstock to perfluorinated compounds. This can lead to serious separation problems because usually the hydrocarbon feedstock has a boiling point about the same as the boiling point of the perfluorinated product.

The present invention provides a solution for the above-described problems. I have now discovered that by employing a combination of electrochemical fluorination and chemical fluorination, together with proper fractionation steps and recycle steps, perfluorocarbon compounds can be more conveniently and economically produced than heretofore considered possible.

Thus, according to the invention, there is provided a process for the production of perfluorocarbon compounds, which process comprises, in combination, the steps of: (a) passing a feedstock comprising a fluorinatable halohydrocarbon containing at least two carbon atoms and at least one halogen atom other than fluorine into an electrochemical fluorination zone and therein at least partially fluorinating said halohydrocarbon to produce a cell effluent stream comprising partially fluorinated halohydrocarbons; (b) fractionating said cell effluent stream to produce a first mixture comprising higher boiling partially fluorinated halohydrocarbons and a second mixture comprising lower boiling partially fluorinated halohydrocarbons which contain an average of at least one more fluorine atom per molecule than said higher boiling partially fluorinated halohydrocarbons and perfluorocarbon product; (c) returning said first mixture to said electrochemical fluorination zone as a portion of said feedstock; (d) fractionating said second mixture from step (b) to produce an overhead stream comprising said perfluorocarbon product and a bottoms stream comprising said lower boiling partially fluorinated halohydrocarbons; (e) reacting said bottoms stream from step (d) under fluorinating conditions with a fluorinating agent capable of further fluorinating said partially fluorinated halohydrocarbons by replacing at least a portion of the halogen atoms other than fluorine therein with fluorine to produce a third mixture comprising further fluorinated partially fluorinated compounds; and (f) returning said third mixture from said step (e) to said step (a) as a portion of said feedstock thereto.

A number of advantages are realized or obtained in the practice of the invention. The method of the invention eliminates the necessity of using either electrochemical fluorination or chemical fluorination exclusively to obtain perfluorinated compounds. By utilizing a combination of both electrochemical fluorination and chemical fluorination, in further combination with proper fractionation tailored in accordance with the feedstock and the desired product, it is possible to take advantage of the best features of each of said fluorination processes, and eliminate the problems associated with each of said fluorination proesses.

In the practice of the invention, the electrochemical fluorination step is operated on a feedstock stream preferably comprising a recycle stream of partially fluorinated chlorohydrocarbons, and make-up or fresh chlorohydrocarbon. In the fluorination of chlorohydrocarbons, as the amount of fluorine in the fluorinated product is increased, there is a successive decrease in the boiling point of said product. For example, the make-up or fresh chlorohydrocarbon and the less fluorinated chlorohydrocarbons have relatively high boiling points, whereas the more highly fluorinated chlorohydrocarbons and the perfluoro compounds have relatively low boiling points.

Make-up or fresh feedstocks which can be utilized in the practice of the invention include the aliphatic halohydrocarbons containing from 2 to 8, preferably 2 to 6, more preferably 2 to 4, carbon atoms per molecule. The presently most preferred make-up feedstocks are those which contain 3 or 4 carbon atoms per molecule. Said feedstocks can be olefinic compounds, but if unsaturated, should not contain more than one double bond. Said feedstocks can also be cyclic compounds. Said feedstocks will contain at least one, but preferably not more than two, halogen atoms other than fluorine per molecule. The presently most preferred feedstocks are the chloroalkanes which can be represented by the formula $$C_nCl_xH_{2n+2-x}$$

wherein $n$ is a whole integer of from 2 to 8, and $x$ is a whole integer of from 1 to 2.

Any suitable electrochemical fluorination process can be employed in the practice of the invention. Thus, electrochemical fluorination processes wherein the feedstock is dissolved in the electrolyte, such as disclosed in Simons 2,519,983 Aug. 22, 1950, can be employed. Electrochemical processes wherein the feedstock is bubbled through a porous anode into the electrolyte, such as disclosed in Ashley et al. 3,298,940 Jan. 17, 1967, can also be employed. However, the presently preferred electrochemical fluorination process for use in the practice of the invention is that disclosed in Fox et al. 3,511,760 May 12, 1970 wherein the feedstock is introduced into the pores of a porous anode and fluorinated within said pores.

Briefly, said preferred electrochemical fluorination process comprises passing the feedstock to be fluorinated into the pores of a non-wetting porous anode, e.g., porous carbon, disposed in a current-conducting, essentially anhydrous hydrogen fluoride electrolyte such as KF·2HF. Said feedstock contacts the fluorinating species within the pores of the anode and is therein at least partially fluorinated. Generally speaking, said fluorination can be carried out at temperatures within the range of from −80 to 500° C. at which the vapor pressure of the electrolyte is not excessive. A preferred temperature range is from about 60 to 120° C. Pressures substantially above or below atmospheric can be employed if desired. Generally speaking, the process is conveniently carried out at substantially atmospheric pressures. The feedstock to be fluorinated is preferably introduced into the pores of the anode at a rate such that there is established a pressure balance within the pores of the anode between the feedstock entering the pores and electrolyte attempting to enter said pores from another and opposing direction. Said feedstock flow rate can be within the range of from 3 to 600 milliliters per minute per square centimeter of anode cross-sectional area, taken perpendicular to the direction of flow and expressed in terms of gaseous volume calculated at standard conditions. Current densities employed can be within the range of 300 to 1000, preferably 50 to 500, milliamps per square centimeter of anode geometric surface area. Typical cell voltages employed can range from 4 to 12 volts. Converted and unconverted products are withdrawn from the pores of the anode and the products recovered from a cell effluent stream.

Further details of said preferred electrochemical fluorination process can be found in said Fox et al. patent. Other anodes which can be employed in said Fox et al. process are disclosed in Childs 3,511,762 May 12, 1970. Another cell and electrode arrangement is disclosed in copending application Ser. No. 765,301, filed Oct. 7, 1968, by Lyle W. Pollock.

Any suitable chemical fluorination process can be employed in the practice of the invention for the second fluorination step of the invention, e.g., the removal of chlorine by substituting fluorine therefor. A considerable number of such processes are known in the art. These processes employ a variety of fluorinating agents and a variety of catalytic promoters for the reaction. For example, hydrogen fluoride can be used in combination with catalytic promoters such as aluminum fluoride, antimony fluoride, antimony fluorochloride, black chromium oxide, titanium fluoride, and the like. Other, though generally less preferred, processes utilize fluorinating agents such as chlorine trifluoride or elemental fluorine in conjunction with catalysts such as aluminum fluoride. Examples of such processes are disclosed in Hovey et al. 2,439,299 Apr. 6, 1948 and also in Tyezkowski et al. 2,831,035 Apr. 15, 1958.

Such chemical fluorination processes can be operated in either the vapor phase or liquid phase at conditions, depending upon the feedstock and the catalyst employed, which include temperatures within the range of 50 to 400° C., pressures within the range of 0 to 1000 p.s.i.g., reaction time in the range of about 1 second to 12 hours, molar ratios of fluorinating agent to feed stock within the range of 1:1 to 10:1 or higher, and employing catalysts in the amount of 1 to 10 weight percent of the fluorinating agent.

One presently preferred chemical fluorination process suitable for use as the second fluorination step in the invention is a vapor phase process comprising using from 20 to 30 weight percent iron chloride on charcoal as the catalyst and hydrogen fluoride as the fluorinating agent. The reaction is carried out at temperatures within the range of 250 to 350° C., at pressures within the range of 0 to 1000 p.s.i.g., space velocities within the range of 1000 to 10,000 GHSV, and at fluorine to chlorine atomic ratios within the range of from 0.2:1 to 5:1.

The drawing is a diagrammatic flow sheet illustrating various embodiments of the invention. It will be understood that many valves, pumps, heaters, coolers, etc., not necessary for explaining the invention have been omitted for brevity.

The following calculated example which is set forth with reference to the drawing will serve to further illustrate the invention.

EXAMPLE

A feed stream comprising a composite recycle stream from conduit 10 and make-up 1-chloropropane from conduit 12 are mixed in said conduit 12. Said recycle stream comprises relatively high boiling fluorinated chlorohydrocarbons and is obtained as described hereinafter. Said combined feed stream is introduced into the pores of a porous anode (preferably porous carbon) mounted in cell 14 which contains an essentially anhydrous KF·2HF electrolyte. Make-up electrolyte can be introduced into said cell via conduit 16. While the invention is here described in terms of employing a single electrochemical fluorination cell, it will be understood that said cell can comprise a battery or plurality of cells with the number thereof being determined by the desired output of perfluoropropane product. In this particular example the cell operating conditions will comprise a cell temperature of about 100° C., a current density of about 250 milliamps per square centimeter of anode geometric surface area, a voltage of about 8 volts, and a feed rate of about 120 milliliters per minute per square centimeter of anode cross-sectional area. The hydrogen conversion per pass is about 24.7 percent.

A cell effluent stream comprising the anode product of the cell is withdrawn via conduit 18 and introduced into fractionator 20 wherein a preliminary separation is made to remove from said cell effluent stream the small amount of high boiling telomers which may be formed in said cell. Said telomers are withdrawn from fractionating column 20 via conduit 22. In some instances, depending upon the amount of said telomers formed, it will be permissible to bypass said fractionating column 20 via conduit 21, or use said fractionating column 20 only intermittently. The stream from conduit 21, or the overhead from fractionating column 20, is passed via conduit 24 into fractionating column 26.

In said fractionating column 26 a separation is effected to produce a first mixture comprising higher boiling partially fluorinated chlorohydrocarbons which is removed from said column 26 as bottoms product via conduit 28, and a second mixture comprising perfluorocarbon product and lower boiling partially fluorinated chlorohydrocarbons which contain an average of at least one more fluorine atom per molecule than said higher boiling partially fluorinated chlorohydrocarbons. Said bottoms product in conduit 28 is passed into conduit 10 as a portion of said composite recycle stream.

Said second mixture is removed as an overhead stream from column 26 via conduit 30 and introduced into fractionating column 32 wherein it is fractionated to produce an overhead stream comprising said perfluorocarbon product which is removed via conduit 34, and a bottoms stream which comprises said lower boiling partially fluorinated chlorohydrocarbons which is removed via conduit 36.

Said stream in conduit 36 is introduced into fluorination zone 38 which, as described above, can comprise any suitable chemical fluorination process wherein chlorine is replaced with fluorine. In this particular example, the fluorination process employed in zone 38 comprises a vapor phase process wherein the feed stream is contacted with hydrogen fluoride in the presence of an iron chloride on charcoal catalyst containing about 26 weight percent ferric chloride, at a temperature of about 300° C., a pressure of about 100 p.s.i.g., a gas hourly space velocity of about 5,000, and a fluorine to chlorine atomic ratio of about 0.5, using HF contained in the stream in conduit 36. It is desired to increase the fluorine to chlorine ratio in zone 38, additional HF can be added via conduit 35. In such instances, it may be desirable to decrease the amount of make-up HF introduced via conduit 16. It will be understood that said fluorination zone 38 comprises or includes a conventional separation means for separating hydrogen chloride produced therein. Said hydrogen chloride is removed from zone 38 via conduit 40. Said stream in conduit 36 is thus contacted with a hydrogen fluoride fluorinating agent under the described operating conditions so as to further fluorinate the partially fluorinated chlorohydrocarbons contained therein by replacing at least a portion of the chlorine atoms with fluorine to produce a third mixture comprising further fluorinated partially fluorinated compounds. Said third mixture, the product from fluorination zone 38, is withdrawn from said zone via conduit 42 and introduced into said conduit 10 for recycle to cell 14 as a portion of said composite recycle stream.

In some instances, depending upon the use to be made thereof, the perfluoropropane product in conduit 34 may be sufficiently pure or require only a minor purification such as the removal of any trace amounts of entrained HF electrolyte which it may contain. In such instances, the stream can be removed from the system via conduit 37 and passed through any suitable HF removal means, not shown. Said HF removal means can comprise any suitable contacting means containing a suitable agent such as bauxite, caustic, etc.

In those instances where a more pure perfluorocarbon product is desired, the overhead stream in conduit 34 can be passed via conduit 40 into fractionating column 42. In said column 42 said stream is fractionated to produce a bottoms product stream comprising partially fluorniated chlorohydrocarbons which is withdrawn via conduit 44 and introduced into conduit 10 for recycle to said cell 14 as a portion of said composite recycle stream. Again, dependnig upon the desired purity of the perfluorocarbon product, the overhead stream from column 42 can be withdrawn therefrom via conduit 46 and, if necessary or desired, treated for HF removal as previously described.

In those instances where an essentially pure perfluorocarbon product is desired, the stream in conduit 46 which is predominantly perfluoropropane, but contains a small amount of light impurities, can be passed via conduit 48 into fractionator or stripper 50 for removal of said light ends via conduit 52 and the recovery of essentially pure perfluoropropane product via conduit 54.

Table I set forth below provides a further description of said stream compositions and amounts in the above-described example.

TABLE I.—DESCRIPTION OF PROCESS STREAMS

| Stream Number | Description of stream | Amount of stream, lbs./hr. |
|---|---|---|
| 16 | Make-up hydrogen fluoride | 1,144 |
| 12 | Make-up 1-chloropropane | 565 |
| 10 | Composite recycle: Approx. chemical composition $C_{3.00}Cl_{0.67}F_{3.35}H_{3.98}$—also contains about 72 lbs. HF. | .428 |
| 18 | Electrochemical cell product: Approx. chem. comp. $C_{3.00}Cl_{0.67}F_{3.42}$—also contains about 215 lbs. HF. | 8,037 |
| 24 | Overhead of Column 20: Approx. chem. comp. $C_{3.00}Cl_{0.71}F_{3.75}H_{3.54}$—also contains about 215 lbs. HF; approx. boiling range 42° C. and lighter. | 7,944 |
| 22 | Bottoms of Column 1: Approx. telomer composition is $[C_{3.00}F_{3.00}H_{3.00}]_x$. | 92 |
| 30 | Overhead of Column 26: Approx. boiling range 25° C. and lighter; Approx. chem. comp. $C_{3.00}Cl_{0.55}F_{4.17}H_{3.28}$—also contains about 215 lbs. HF. | 5,327 |
| 28 | Bottoms of Column 26 to recycle: Approx. boiling range 25° C. to 42° C.; Approx. chem. comp. $C_{3.00}Cl_{1.00}F_{3.00}H_{4.00}$. | 2,617 |
| 31 | Overhead of Column 32: Approx. boiling range −15° C. and lighter; Approx. chem. comp. $C_{3.00}Cl_{0.00}F_{4.64}H_{3.37}$. | 3,367 |
| 36 | Bottoms of Column 32 to fluorination zone 38: Approx. boiling range −15° C.-25° C.; Approx. chem. comp. $C_{3.00}Cl_{1.03}F_{3.51}H_{2.56}$—also contains about 215 lbs. HF. | 1,960 |
| 40 | Hydrogen chloride from HCl stripper operating in conjunction with fluorination zone 38. | 258 |
| 42 | Product of fluorination zone 38 to recycle stream 10: Approx. chem. comp. $C_{3.00}Cl_{0.25}F_{3.80}H_{2.95}$—also contains about 72 lbs. HF. | 1,717 |
| 48 | Overhead of Column 42: Predominantly perfluoropropane but contains light impurities. | 1,273 |
| 44 | Bottoms of column 42 to recycle stream 10: Approx. chem. comp. $C_{3.00}Cl_{0.02}F_{3.47}H_{4.10}$; boiling range −35° C. to −15° C. | 2,094 |
| 52 | Light impurities which average $CF_2H_2$ $(C_2F_4H_4)$. | 8 |
| 54 | Essentially pure perfluoropropane, $C_3F_8$. | 1,266 |
| 55 | Cathode product of Cell 14, $H_2$, any HF carried out in this stream is condensed and returned to cell. | 100 |

The above example illustrates the real and effective cooperation between the various steps of the method of the invention. For example, the electrochemical fluorination cell 14 produces a feedstock for the second fluorination step of the invention (fluorination zone 38), and the second fluorination step furnishes the major portion of the feedstock to said electrochemical fluorination cell 14. Only a relatively small amount of make-up feedstock is used, e.g., about 8 percent in the above example. The amount of said make-up feedstock used will depend upon the operating conditions in the fluorination steps. Generally speaking, said make-up feedstock will be within the range of about 5 to about 20 weight percent of the total feed to the process.

Another example of the cooperation between the steps of the method of the invention in the presently preferred embodiment thereof is that HF carried over in the effluent from electrochemical fluorination cell can be utilized as at least a portion of the fluorinating agent in fluorination zone 38. Essentially all, if not all, of the HF in the cell effluent stream is removed therefrom in fractionation zone 32 and passed via conduit 36 to chemical fluorination zone 38, eliminating any necessity for providing other means to remove HF from the cell effluent stream. Thus, cell 14 not only produces feedstock for the second fluorination step, it also produces fluorinating agent. Any excess HF not utilized in chemical fluorination zone 38 is removed therefrom via conduit 42 and returned to cell 14 via conduit 10. Thus, make-up HF added to the system can be proportioned between conduits 16 and 35. The amount of HF contained in the cell effluent stream can be varied by varying the cell operating conditions of temperature and pressure.

An important feature of the invention which contributes to the overall cooperation between the steps of the method, and particularly to the cooperation between the two fluorination steps, is the fractionation of the cell effluent stream. It will be noted that in the above example in column 26, a separation is effected between a bottoms stream 28 comprising the higher boiling partially fluorinated chlorohydrocarbons and containing an average of 3.00 atoms of fluorine per molecule, and an overhead stream 30 comprising the lower boiling partially fluorinated chlorohydrocarbons and containing an average of 4.17 atoms of fluorine per molecule. In the practice of the invention, the higher boiling partially fluorinated chlorohydrocarbons in said bottoms stream will preferably contain an average of at least one more fluorine atom per molecule than the lower boiling partially fluorinated chlorohydrocarbons in said overhead stream. This separation thus makes it possible to take the stream comprising the lower boiling partially fluorinated chlorohydrocarbons (containing the greater fluorine content) to the second fluorination step reactor for further fluorination, and take the other stream comprising the higher boiling partially fluorinated chlorohydrocarbons (containing the lesser fluorine content) to the electrochemical fluorination cell for further fluorination, without concern for producing anything in either of said fluorination steps which interferes with the separation of the desired product from the cell effluent stream.

In the above example, the separation of the partially fluorinated chlorohydrocarbons is effected between compounds containing an average of 3 atoms of fluorine per molecule and compounds containing an average of about 4 atoms of fluorine per molecule. This cut point can be varied depending upon the feedstock and the fluorocarbon compound desired to be produced. Thus, in some instances, the cut point in the fractionation of the cell effluent in a column such as column 26, can between compounds containing an average of about 3 atoms of fluorine per molecule, or between compounds containing an average of about 4 atoms of fluorine per molecule and compounds containing an average of about 5 atoms of fluorine per molecule.

While certain embodiments of the invention have been described for illustrative purposes, the invention is not limited thereto. Various other modifications or embodiments of the invention will be apparent to those skilled in the art in view of this disclosure. Such modifications or embodiments are within the sprit and scope of the disclosure.

I claim:
1. A process for the production of perfluorocarbon compounds, which process comprises, in combination, the steps of:
(a) passing a feedstock comprising a fluorinatable halohydrocarbon containing at least two carbon atoms and at least one halogen atom other than fluorine into a electrochemical fluorination zone and therein at least partially fluorinating said halohydrocarbon to produce a cell effluent stream comprising partially fuorinated halohydrocarbons;
(b) fractionating said cell effluent stream to produce a first mixture comprising higher boiling partially fluorinated halohydrocarbons and a second mixture comprising lower boiling partially fluorinated halohydrocarbons which contain an average of at least one more fluorine atom per molecule than said higher boiling partially fluorinated halohydrocarbons and perfluorocarbon products;
(c) returning said first mixture to said electrochemical fluorination zone as a portion of said feedstock;
(d) fractionating said second mixture from step (b) to produce an overhead stream comprising said perfluorocarbon product and a bottoms stream comprising said lower boiling partially fluorinated halohydrocarbons;
(e) reacting said bottoms stream from step (d) under fluorinating conditions with a fluorinating agent capable of further fluorinating said partially fluorinated halohydrocarbons by replacing at least a portion of the halogen atoms other than fluorine therein with fluorine to produce a third mixture comprising further fluorinated partially fluorinated compounds; and
(f) returning said third mixture from said step (e) to said step (a) as a portion of said feedstock thereto.

2. A process according to claim 1 wherein said fluorinatable halohydrocarbon contains from 2 to 8 carbon atoms and not more than two halogen atoms other than fluorine per molecule and said feedstock comprises about 5 to about 20 weight percent make-up feed based on total feedstock and the remainder of the feedstock comprises recycle of said first and third mixtures obtained from steps (b) and (e), respectively.

3. A process according to claim 2 wherein said halogen other than fluorine is chlorine.

4. A process according to claim 3 wherein said fluorinatable chlorohydrocarbon contains from 2 to 4 carbon atoms per molecule.

5. A process according to claim 4 wherein the fluorinating agent used in step (e) is HF, and at least a portion of said fluorinating agent is contained in said bottoms stream from step (d).

6. A process according to claim 5 wherein said fluorinatable chlorohydrocarbon is monochloropropane, and said perfluorocarbon product is perfluoropropane.

7. A process according to claim 1 comprising, in further combination, the steps of:
(g) fractionating said overhead stream from step (d) to recover therefrom a product stream comprising essentially pure perfluorocarbon product, and a stream comprising partially fluorinated halohydrocarbons; and
(h) returning said stream comprising partially fluorinated halohydrocarbons from step (g) to said step (a) as a portion of said feedstock thereto.

8. A process according to claim 7 wherein said fluorinatable halohydrocarbon contains from 2 to 8 carbon atoms and not more than two halogen atoms other than fluorine per molecule and said feedstock comprises about 5 to about 20 weight percent make-up feed based on total feedstock and the remainder of the feedstock comprises recycle of said first and third mixtures obtained from steps (b) and (e), respectively, and said stream comprising partially fluorinated halohydrocarbons obtained in step (g).

9. A process according to claim 8 wherein said halogen other than fluorine is chlorine.

10. A process according to claim 9 wherein said fluorinatable chlorohydrocarbon contains from 2 to 4 carbon atoms per molecule.

11. A process according to claim 10 wherein the fluorinating agent used in step (e) is HF, and at least a portion of said fluorinating agent is contained in said bottoms stream from step (d).

12. A process according to claim 11 wherein said fluorinatable chlorohydrocarbon is monochloropropane, and said perfluorocarbon product is perfluoropropane.

References Cited
UNITED STATES PATENTS

| | | | |
|---|---|---|---|
| 3,551,307 | 12/1970 | Gray | 204—59 R |
| 2,831,035 | 4/1958 | Tyezkowski et al. | 260—653.8 |
| 2,439,299 | 4/1948 | Hovey et al. | 260—653.7 |
| 3,551,307 | 12/1970 | Gray | 204—59 R |
| 3,620,941 | 11/1971 | Ruehlen | 204—59 R |
| 3,650,917 | 3/1972 | Ruehlen | 204—59 R |

FREDERICK C. EDMUNDSON, Primary Examiner

U.S. Cl. X.R.

260—653.7, 653.8, 653.9